(12) United States Patent (10) Patent No.: US 11,430,232 B2
Amthor et al. (45) Date of Patent: Aug. 30, 2022

(54) METHOD FOR SPLITTING ONE OR MORE IMAGES OF A SAMPLE INTO IMAGE DATA SPLIT ACCORDING TO DYES, COMPUTER PROGRAM, COMPUTER-READABLE MEDIUM STORING THE PROGRAM AND SYSTEM FOR PERFORMING THE METHOD

(71) Applicant: Carl Zeiss Microscopy GmbH, Jena (DE)

(72) Inventors: Manuel Amthor, Jena (DE); Daniel Haase, Zoellnitz (DE); Ingo Kleppe, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 92 days.

(21) Appl. No.: 15/733,532

(22) PCT Filed: Feb. 25, 2019

(86) PCT No.: PCT/EP2019/054558
§ 371 (c)(1),
(2) Date: Aug. 21, 2020

(87) PCT Pub. No.: WO2019/166361
PCT Pub. Date: Sep. 6, 2019

(65) Prior Publication Data
US 2021/0089749 A1 Mar. 25, 2021

(30) Foreign Application Priority Data
Feb. 28, 2018 (DE) ..................... 10 2018 104 616.2

(51) Int. Cl.
*G06V 20/69* (2022.01)
*G06T 7/11* (2017.01)
(Continued)

(52) U.S. Cl.
CPC ......... *G06V 20/69* (2022.01); *G01N 21/6458* (2013.01); *G06K 9/6267* (2013.01);
(Continued)

(58) Field of Classification Search
CPC ........... G06V 20/69; G06T 7/11; G06T 5/002; G06T 2207/10024; G06T 2207/20084;
(Continued)

(56) References Cited

U.S. PATENT DOCUMENTS 8,462,981 B2 * 6/2013 Determan ............ G06V 20/695
382/100
9,378,407 B2 6/2016 Zhang et al.
(Continued)

FOREIGN PATENT DOCUMENTS

DE 296 24 210 U1 6/2001
DE 103 19 946 11/2004
(Continued)

OTHER PUBLICATIONS

International Search Report dated Jun. 3, 2019 in PCT/EP2019/054558 with English translation, 6 pages.
(Continued)

*Primary Examiner* — Utpal D Shah
(74) *Attorney, Agent, or Firm* — Grüneberg and Myers PLLC

(57) ABSTRACT

One or more images of a sample may be split into image data split according to dyes. The sample has at least two different dyes, in particular fluorescent dyes. The method for splitting the one or more images includes providing the one or more images of the sample and inputting the one or more images into a machine learning system. The method then includes generating the image data split according to dyes from the image or the images, using the machine learning system. The machine learning system removes at least one partial struc-
(Continued)

ture of the sample that is present in the image data split according to dyes of more than one dye from the image data of one or more dyes.

**18 Claims, 3 Drawing Sheets
(2 of 3 Drawing Sheet(s) Filed in Color)**

(51) Int. Cl.
*G01N 21/64* (2006.01)
*G06K 9/62* (2022.01)
*G06N 3/04* (2006.01)
*G06N 3/08* (2006.01)
*G06T 5/00* (2006.01)

(52) U.S. Cl.
CPC ............ *G06N 3/0454* (2013.01); *G06N 3/08* (2013.01); *G06T 5/002* (2013.01); *G06T 7/11* (2017.01); *G06T 2207/10024* (2013.01); *G06T 2207/20084* (2013.01); *G06T 2207/30024* (2013.01)

(58) Field of Classification Search
CPC ...... G06T 2207/30024; G01N 21/6458; G06K 9/6267; G06N 3/0454; G06N 3/08
See application file for complete search history.

(56) References Cited

U.S. PATENT DOCUMENTS

| | | | |
|---|---|---|---|
| 2002/0165837 | A1 | 11/2002 | Zhang et al. |
| 2004/0251426 | A1 | 12/2004 | Birk et al. |
| 2009/0161928 | A1 | 6/2009 | Khamene et al. |
| 2014/0072195 | A1 | 3/2014 | Zhang et al. |
| 2015/0216398 | A1 | 8/2015 | Yang et al. |
| 2017/0052119 | A1 | 2/2017 | Kumar et al. |
| 2017/0161900 | A1 | 6/2017 | Garcia et al. |
| 2018/0121709 | A1* | 5/2018 | Garsha .................. G06V 10/28 |
| 2020/0167905 | A1* | 5/2020 | Bian .................. G01N 21/8851 |
| 2021/0404958 | A1* | 12/2021 | Min .................. G01N 21/6458 |
| 2022/0019828 | A1* | 1/2022 | Amthor .................. G06N 3/08 |

FOREIGN PATENT DOCUMENTS

| | | |
|---|---|---|
| DE | 10 2008 060 789 | 8/2009 |
| WO | 2015/177268 | 11/2015 |

OTHER PUBLICATIONS

Written Opinion dated Jun. 3, 2019 in PCT/EP2019/054558 with English translation, 9 pages.

Cai et al., "*DehazeNet: An End-to-End System for Single Image Haze Removal,*" arXiv:1601.07661v2 [cs.CV] May 17, 2016, 13 pages.

Chan et al., "*Neighbor embedding based super-resolution algorithm through edge detection and feature selection,*" Pattern Recognition Letters, vol. 30, 2009, pp. 494-502.

Dickinson et al., "Practical Considerations for Spectral Imaging," http://zeiss-campus.magnet.fsu.edu/articles/spectralimaging/considerations.html, obtained from the internet on Jul. 24, 2020, 15 pages.

Dong et al., "*Image Super-Resolution Using Deep Convolutional Networks,*" arXiv:1501:00092v3 [cs.CV] Jul. 31, 2015, 14 pages.

Khizar Hayat, "*Super-Resolution via Deep Learning,*" arXiv:1706.09077v1 [cs.CV] Jun. 28, 2017, 33 pages.

Ledig et al., "*Photo-Realistic Single Image Super-Resolution Using a Generative Adversarial Network,*" arXiv:1609.04802v5 [cs.CV] May 25, 2017, 19 pages.

Megjhani et al., "*Morphologically constrained spectral unmixing by dictionary learning for multiplex fluorescence microscopy,*" Bioinformatics, vol. 33(14), 2017, pp. 2182-2190.

Neher et al., "*Optimizing imaging parameters for the separation of multiple labels in a fluorescence image,*" Journal of Microscopy, vol. 213, Pt. 1 Jan. 2004, pp. 46-62.

Rainey et al., "*Spectral Imaging with Linear Unmixing,*" http://zeiss-campus.magnet.fsu.edu/tutorials/spectralimaging/linearunmixing/indexflash.html, obtained from internet on Jul. 24, 2020, 4 pages.

Rivenson et al., "*Phase recovery and holographic image reconstruction using deep learning in neural networks,*" Light Sci. Appl. 7, 17141 (2018), 30 pages.

Schuler et al., "*A machine learning approach for non-blind image deconvolution,*" Proc. IEEE Conference on Computer Vision and Pattern Recognition 2013, http://webday.is.mpg.de/pixel/neural_deconvolution/, 8 pages.

Weigert et al., "*Content-Aware Image Restoration: Pushing the Limits of Fluorescence Microscopy,*" https://www.biorxiv.org/content/10.1101/236463v5, Dec. 19, 2017, 16 pages.

Yang et al., "*Image super-resolution via sparse representation,*" IEEE Transactions on Image Processing, vol. 19, Issue: 11, Nov. 2010, 12 pages.

Yeh et al., "*Semantic Image Inpainting with Deep Generative Models,*" arXiv:1607.07539v3 [cs.CV] Jul. 13, 2017, 19 pages.

Zhang et al., "*Beyond a Gaussian Denoiser: Residual Learning of Deep CNN for Image Denoising,*" arXiv:1608.03981v1 [cs.CV] Aug. 13, 2016, 13 pages.

Timo Zimmermann, "*Spectral Imaging and Linear Unmixing in Light Microscopy,*" Adv Biochem Engin/Biotechnol, vol. 95, 2005, pp. 245-265.

Zimmermann et al., "*Clearing Up the Signal: Spectral Imaging and Linear Unmixing in Fluorescence Microscopy,*" Confocal Microscopy: Methods and Protocols, Methods in Molecular Biology, vol. 1075, 2014, pp. 129-148.

\* cited by examiner

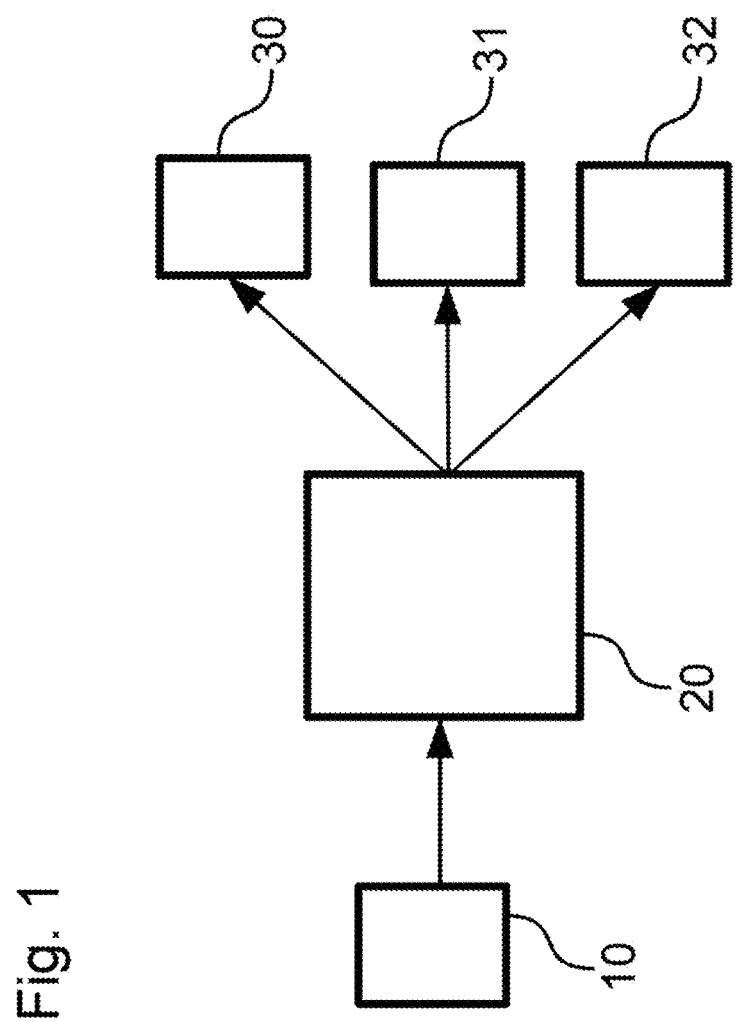

METHOD FOR SPLITTING ONE OR MORE IMAGES OF A SAMPLE INTO IMAGE DATA SPLIT ACCORDING TO DYES, COMPUTER PROGRAM, COMPUTER-READABLE MEDIUM STORING THE PROGRAM AND SYSTEM FOR PERFORMING THE METHOD

This application is the National Stage entry under § 371 of International Application No. PCT/EP2019/054558, filed on Feb. 25, 2019, and which claims the benefit of German Application No. 10 2018 104 616.2, filed on Feb. 28, 2018, the contents of both of which are hereby incorporated by reference in their entireties.

BACKGROUND OF THE INVENTION

Field of the Invention

The invention relates to a method for splitting one or more images of a sample into image data split according to dyes, a computer program product, a computer-readable medium storing the computer program product and a system for splitting one or more images of a sample into image data split according to dyes.

Description of Related Art

In fluorescence microscopy, samples (e.g. biological samples) are marked with a plurality of fluorescent dyes. The images recorded by a microscope, for example, are subsequently separated according to fluorescent dyes. As a result of overlapping excitation spectra and/or emission spectra of the fluorescent dyes, optical artefacts or elements assigned erroneously or incorrectly to the respective fluorescent dye usually occur in the images split according to fluorescent dyes (so-called "bleed-through" or so-called "crosstalk"). Specifically, this means that in the resulting images separated according to fluorescent dyes, pixels or structures from one color channel or one channel of one fluorescent dye are also visible (in an attenuated manner) in another (at least one other) color channel or channel of another fluorescent dye, i.e. elements or structures are in part assigned to the incorrect channel or to the incorrect fluorescent dye (so-called artefacts).

By way of example, linear unmixing is used for splitting the image or images according to fluorescent dyes. During linear unmixing, the image or images is/are unmixed pixel by pixel, i.e. split according to fluorescent dyes. FIG. 4a and FIG. 4b show channels or images or image data 30', 31' split according to fluorescent dyes by means of linear unmixing in accordance with the prior art. In FIG. 4b, the linear structures are optical artefacts, i.e. elements/pixels from the channel or image or of the fluorescent dye shown in FIG. 4a that are assigned incorrectly to this channel or image or this fluorescent dye.

What is disadvantageous about this, however, is that usually even after linear unmixing has been carried out, in the channels or images split according to fluorescent dye, optical artefacts (i.e. pixels assigned to the incorrect fluorescent dye) are present, inter glia on account of random influences (e.g. noise) influencing the values in the image, and/or on account of the fact that the spectra of the fluorescent dyes used are not known exactly.

BRIEF SUMMARY OF THE INVENTION

The present invention is based on the object of disclosing a method and respectively a device and respectively a system by means of which an image or images of samples is/are or can be split into image data according to dyes in such a way that the image data split according to dyes have few to no optical artefacts or elements allocated or assigned to the incorrect dye in each case.

This object is achieved in each case by means of a method for splitting one or more images of a sample into image data split according to dyes and respectively a computer program product and respectively a computer-readable medium storing the computer program product and respectively a system for splitting one or more images of a sample into image data split according to dyes.

DETAILED DESCRIPTION OF THE INVENTION

In particular, the object is achieved by means of a method for splitting one or more images of a sample into image data split according to dyes, wherein the sample has at least two different dyes, in particular fluorescent dyes, wherein the method comprises the following steps: providing the one or more images of the sample; inputting the one or more images into a machine learning system; and generating the image data split according to dyes from the image or the images by means of the machine learning system, wherein the machine learning system removes at least one partial structure of the sample that is present in the image data split according to dyes of more than one dye from the image data of one or more dyes.

One advantage of this is that without explicit specification or predefinition of the mapping of the input data (images of the sample) onto the output data (image data separated according to dyes) following training (e.g. with training data), the machine learning system generates image data or images with few to no elements or optical artefacts allocated to the incorrect dye (i.e. pixels or structures in image data of one dye that bleed through into image data of another dye or represent crosstalk there). What is also advantageous is that the machine learning system can generate image data that are superior to linear unmixing such as is known from the prior art, since image data split according to dyes are output which have fewer elements or optical artefacts allocated to the incorrect dye or incorrect assignments to the respective image data. Moreover, by means of the learning system, images of a multiplicity of samples of different kinds, without significant changes in the machine learning system, can be decomposed or split rapidly and technically simply into image data split according to dyes with few to no elements or optical artefacts allocated to the incorrect dye. What is advantageous, moreover, is that the method does not carry out an assignment to the respective dye pixel by pixel, but rather operates in a structure-based manner. Structures or partial structures of the sample can be recognized for example by means of edge recognition or the like. If images already separated according to dye previously are input as input data into the machine learning system, elements or optical artefacts allocated to the incorrect dye and present in the images input can be prevented or suppressed in the generated image data by means of the method, i.e. the generated image data contain fewer elements or optical artefacts allocated to the incorrect dye than the input images already separated according to dye previously. If the images input have not already been separated according to dyes previously, i.e. the image or images has/have in each case data of a plurality of dyes, then the machine learning system outputs image data split according to dyes in which few to no elements or optical artefacts allocated to the incorrect dye are present. Prevention of the occurrence of optical artefacts in the image data split according to dyes is thus usually achieved.

Splitting the one or more images of the sample can mean, in particular, that proceeding from raw data or untreated images, image data split according to dyes are generated as output which contain few or no elements or optical artefacts assigned to the incorrect dye, or that proceeding from images already separated according to dyes previously, elements or optical artefacts assigned to the incorrect dye are removed from said images, such that image data split according to dyes are output which have few or no elements or optical artefacts assigned to the incorrect dye.

In particular, in the course of splitting according to dyes, an element is assigned correctly or assigned to the correct dye if the respective element comprises the respective dye or is marked with the latter. The partial structures removed from the image data of one or more dyes can be allocated to image data of one or more other dyes, such that a kind of displacement of the partial structure or of the image data of the partial structure from image data of a first dye into image data of a second dye is carried out. However, it is also possible that the partial structure or the image data of the partial structure is/are removed only from image data of one or more dyes, but the partial structure or the image data of the partial structure is/are assigned to no image data of other dyes, that is to say that no displacement of image data takes place.

In particular, the object is also achieved by means of a computer program product having instructions which are readable by a processor of a computer and which, when they are executed by the processor, cause the processor to carry out the method described above.

In particular, the object is also achieved by means of a system for splitting one or more images of a sample into image data split according to dyes, wherein the sample has at least two different dyes, in particular fluorescent dyes, wherein the system comprises a machine learning system trained to carry out the following: generating the image data split according to dyes from one or more images of the sample input into the machine learning system, by means of the machine learning system, wherein the machine learning system removes at least one partial structure of the sample that is present in the image data split according to dyes of more than one dye from the image data of one or more dyes.

One advantage of this is that without explicit specification or predefinition of the mapping of the input data (images of the sample) onto the output data (image data separated according to dyes), the system generates image data or images with few to no elements or optical artefacts allocated to the incorrect dye (i.e. pixels or structures in image data of one dye that bleed through into image data of another dye or represent crosstalk there). What is also advantageous about the system is that the system generates image data that are superior to linear unmixing such as is known from the prior art, since image data split according to dyes are output which have fewer elements or optical artefacts allocated to the incorrect dye or incorrect assignments to the respective image data. Moreover, by means of the system, images of a multiplicity of samples of different kinds, without significant changes in the system, can be decomposed or split rapidly and technically simply into image data split according to dyes with few to no elements or optical artefacts allocated to the incorrect dye. What is advantageous, moreover, is that the system does not carry out an assignment to the respective dye pixel by pixel, but rather operates in a structure-based manner. If images already separated according to dye previously are input as input data into the system, elements or optical artefacts allocated to the incorrect dye and present in the images input can be prevented or suppressed in the generated image data by means of the system, i.e. the generated image data contain fewer elements or optical artefacts allocated to the incorrect dye than the input images already separated according to dye previously. If the images input have not already been separated according to dyes previously, i.e. the image or images has/have in each case data of a plurality of dyes, then the system outputs image data split according to dyes in which few to no elements or optical artefacts allocated to the incorrect dye are present.

In accordance with one embodiment of the method, the method furthermore comprises the following steps: inputting reference images into the machine learning system; and comparing the image data of the reference images split according to dyes by means of the machine learning system with image data of the reference images split correctly according to dyes for training the machine learning system for improved splitting of the one or more images of the sample into image data split according to dyes. What is advantageous about this is that the machine learning system can be trained rapidly and technically simply without explicit specification or predefinition of the mapping of the input data onto the output data. The comparing can take place in an automated or computerized manner, e.g. by means of the machine learning system, such that no manual intervention or no intervention by a human being is necessary in particular during the comparing. The image data split correctly according to dyes contains substantially no elements or optical artefacts allocated to the incorrect dye. In the case of the image data split correctly according to dyes, elements or optical artefacts allocated to the incorrect dye may have been removed manually or by a human being, for example.

In accordance with one embodiment of the method, the machine learning system comprises or is a neural network, in particular a deep learning system and/or a convolutional neural network. What is advantageous about this is that elements or optical artefacts allocated to the incorrect dye in the channels can be or are suppressed even better. Moreover, the machine learning system is constructed in a technically simple fashion.

In accordance with one embodiment of the method, the image is or the images are subjected to linear or nonlinear unmixing and/or denoising before being input into the machine learning system. As a result, in a technically simple manner, the linear unmixing can be combined with the splitting according to the dyes by means of the machine learning system, such that even fewer elements or artefacts allocated to the incorrect dye are present in the image data split according to the dye. As a result of the denoising before inputting, the number of elements or optical artefacts allocated to the incorrect dye in the split image data can be reduced even further.

In accordance with one embodiment of the method, the removing of partial structures of the sample is carried out on the basis of the structure of the sample, wherein in particular optical artefacts in the image data are determined on the basis of identical and/or similar partial structures in the image data of different dyes. As a result, the number of elements or optical artefacts allocated to the incorrect dye in the image data split according to dyes can be reduced even further, since splitting according to dyes does not take place pixel by pixel, rather splitting according to dyes is carried out on the basis of the structure of the sample. The machine learning system thus takes account of the fact that the pixels of the image or images input are not (completely) independent of one another.

In accordance with one embodiment of the method, besides the one or more images spectra of the dyes used, a spectra database for estimating and/or matching the spectra of the dyes present in the one or more images, recording settings and/or filter settings of the one or more images, detector settings of the one or more images and/or predictions concerning crosstalk between the different image data split according to dyes are additionally input into the machine learning system. What is advantageous about this is that the splitting according to dyes can be carried out even more reliably or more correctly.

In accordance with one embodiment of the method, the image data comprise output images, wherein in particular each output image shows in each case a dye of the image or the images input. One advantage of this is that the image data can be viewed or examined particularly simply. Furthermore, if each output image shows in each case a dye of the image or images input, the dyes can be examined or viewed in any desired combinations with one another.

In accordance with one embodiment of the method, the machine learning system generates a coefficient array for linear unmixing, wherein the one or more images is/are split according to dyes by means of the linear unmixing on the basis of the coefficient array. One advantage of this is that images separated according to dyes are not generated directly, rather the coefficient array generated is or can be used to carry out subsequent linear unmixing, the result of which is images or image data with particularly few elements or optical artefacts allocated to the incorrect dye. As a result, splitting the images according to dyes and removing partial structures can be considerably accelerated since the linear unmixing requires particularly little computation time.

In accordance with one embodiment of the method, the machine learning system generates one or more difference images from the image data split according to dyes, wherein images already separated according to dyes previously minus the respective generated difference image associated therewith generate output images separated according to dyes. What is advantageous about this is that a respective difference image is generated for the dyes, by which difference image the image respectively associated with the dye has to be corrected in order to attain images or image data with the fewest possible elements or optical artefacts allocated to the incorrect dye. Difference images can be interpreted more intuitively by human beings during the training of the machine learning system. Moreover, difference images are more readily accepted by researchers since the correction of the images already split according to dyes previously (e.g. images split previously by means of linear unmixing) by the machine learning system is comprehensible to human beings. In addition, it has been found that the training of a machine learning system that maps onto difference images or correction images or outputs such images (so-called residual learning) is significantly faster or more effective and yields better results, i.e. generates image data with fewer elements or optical artefacts allocated to the incorrect dye.

In accordance with one embodiment of the method, the plurality of images comprise or are recordings of the same sample that are temporally offset with respect to one another and/or comprise or are recordings of the same sample that are offset with respect to one another along an optical axis of a microscope by which the images were recorded. As a result, in particular temporal developments or changes, e.g. of living samples (for example animals, cells, etc.), can be split particularly reliably into image data separated according to dyes. As a result, a so-called Z-stack (i.e. a stack of images along the optical axis of the microscope) can be decomposed by means of the machine learning system into image data split according to dyes, wherein the image data have few to no elements or optical artefacts allocated to the incorrect dye.

In accordance with one embodiment of the method, the machine learning system additionally determines or estimates the number of dyes used for marking the sample and/or identifies the dyes used for marking the sample. What is advantageous about this is that the number and/or identity of the dyes used need not be input into the machine learning system. Moreover, further information about the sample can be determined by the machine learning system.

In accordance with one embodiment of the method, the machine learning system furthermore determines for each pixel of the image data output a confidence value indicating the probability that this pixel was assigned to the correct image data corresponding to the dye, and/or determines the absolute concentration of the respective dye in the respective image data and/or determines the number of objects in the sample. The determination of the confidence value has the advantage that the quality of the split image data can be better assessed since the degree of certainty of the respective assignment of the pixel to the respective image data (so-called confidence) is indicated in each case. Moreover, it is conceivable to generate for the image data split according to dyes a respective confidence map, i.e. a two-dimensional map indicating the confidence value for each pixel or each partial structure of the sample. The determination of the absolute concentration of the dyes (following a calibration) thus yields further information about the sample. The determination of the number of objects yields further information about the sample, which, in an automated manner, for example, can be processed further or be used for categorizing the images of the sample.

In accordance with one embodiment of the method, the machine learning system is trained by means of first training recordings, wherein the first training recordings comprise recordings of samples marked in each case only with one dye, and/or is trained by means of second training recordings, wherein the second training recordings comprise combined recordings of image data already split correctly in each case according to dye. Particularly efficient and reliable training of the machine learning system is achieved by means of the first training recordings. By means of the second training recordings, the machine learning system can be trained with particularly little complexity or within a very short time.

In accordance with one embodiment of the method, the image data split correctly according to dyes comprise or are simulated image data, in particular the image data split correctly according to dyes comprise or are simulated image data generated by means of a physical model, wherein preferably the physical model comprises a physical model of a recording optical unit, and/or the reference images are generated by means of a physical model from the image data split correctly according to dyes. As a result, training data of the machine learning system can be generated in large numbers. The physical model can contain in particular a model that simulates the excitation of the sample with different lasers and/or the noise when a true recording or a true image of a sample arises or is generated. The image data split correctly according to dyes can be mixed together by means of a physical model and in this way the reference images can be generated in a technically simple manner.

In accordance with one embodiment of the method, the machine learning system determines spectra of the dyes. Consequently, if e.g. a spectra database was used, the spectra can be determined or refined more accurately.

The dyes can comprise or be fluorescent dyes and/or bright field dyes.

It is conceivable that if the dyes comprise or are fluorescent dyes, one of the at least two fluorescent dyes which the sample has or with which the sample is marked is a natural (not added) fluorescent dye of the sample having autofluorescence, that is to say that the sample has a fluorescent dye added to the sample and a natural autofluorescent dye (already originally present in the sample) or is marked with said dyes.

Splitting into image data split according to dyes can mean, in particular, that respective image data are assigned in each case to exactly one dye or have only information or radiation or fluorescence from exactly one dye. It is also conceivable, however, for respective image data to have information from more than one dye. In this regard, by way of example, an image of a sample can be split into two sets of image data, wherein a first set has information or radiation or fluorescence from two dyes, while a second set has information or radiation or fluorescence from exactly one dye.

The sample usually has a structure, which in turn has partial structures. In this regard, a biological sample can have e.g. a cell nucleus and cell walls as structure or partial structures. The cell nucleus can be a partial structure in this example. The cell wall or the cell walls can be a further partial structure in this example. Partial structures of the sample can be separated from one another for example by edges in the image or non-fluorescent regions in the image.

When removing a partial structure of the sample, wherein the partial structure is present in the image data split according to dyes of more than one dye, from the image data of one or more dyes, it is thus possible for example for the cell nucleus of a cell (that is present e.g. incorrectly in image data of two dyes) to be removed from the image data of a first dye. Consequently, in the method, individual pixels are typically not removed from image data of a dye, rather partial structures of the sample, i.e. regions recognized as contiguous or as belonging to a partial structure of the sample, are removed from the image data of a dye. Structure-based removal, in particular, can thus be carried out.

Elements or optical artefacts assigned to the incorrect dye can be, in particular, pixels or regions or partial structures of the sample which are or were assigned incorrectly to image data of a dye or to a dye. This means, in particular, that pixels or regions or partial structures that are marked with only a first dye, for example, are also present in split image data of a second dye generated by the machine learning system, said second dye being different than the first dye. Elements or optical artefacts assigned to the incorrect dye are also referred to as bleed-through or crosstalk.

The optical axis of the microscope runs in particular along the direction in which the recording is effected by means of the microscope.

Preferred embodiments are evident. The invention is explained in greater detail below with reference to drawings of exemplary embodiments. In the figures:

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1 shows a schematic illustration of one embodiment of the method according to the invention for splitting one or more images of a sample into image data split according to dyes.

The same reference numerals are used in the following description for identical parts and parts having an identical effect.

FIG. 1 shows a schematic illustration of one embodiment of the method according to the invention for splitting one or more images of a sample into image data 30-32 split according to dyes. FIG. 2 shows a fluorescence image of a sample before one or more images of a sample is/are split into image data 30-32 split according to dyes in accordance with one embodiment of the method according to the invention. FIGS. 3a, 3b show images of the fluorescence image from FIG. 2 split according to fluorescent dyes after one or more images of a sample has/have been split into image data split according to dyes in accordance with one embodiment of the method according to the invention.

Figure 3A:
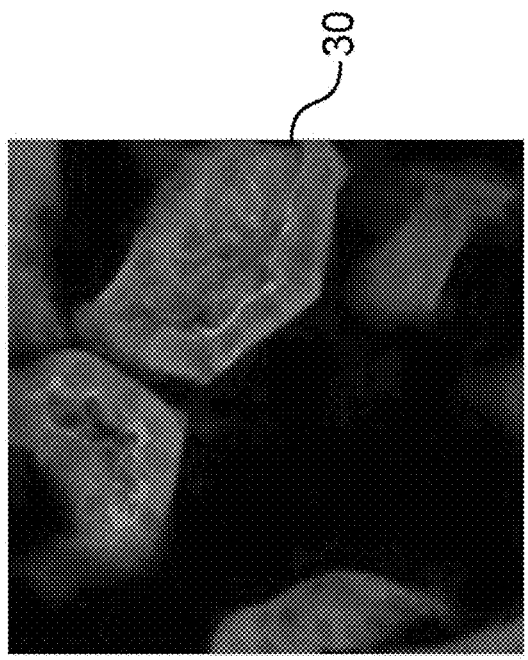
FIG. 3a shows an image of the fluorescence image from FIG. 2 split according to a green fluorescent dye, after one or more images of a sample has/have been split into image data split according to dyes in accordance with one embodiment of the method according to the invention.
Figure 3B:
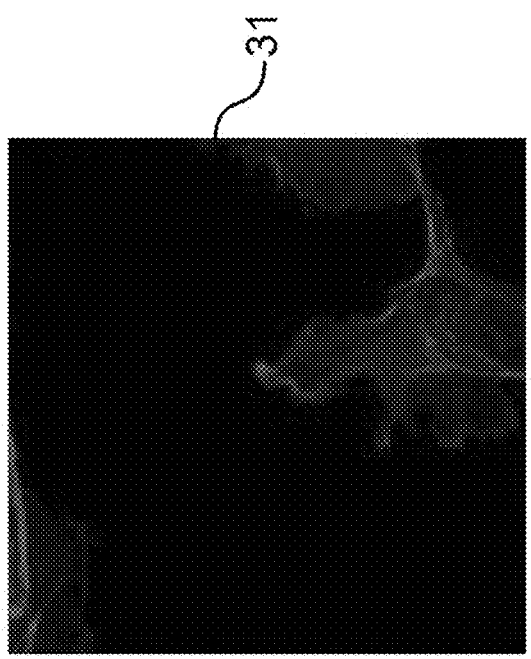
FIG. 3b shows an image of the fluorescence image from FIG. 2 split according to a red fluorescent dye, after one or more images of a sample has/have been split into image data split according to dyes in accordance with one embodiment of the method according to the invention.
Figure 2:
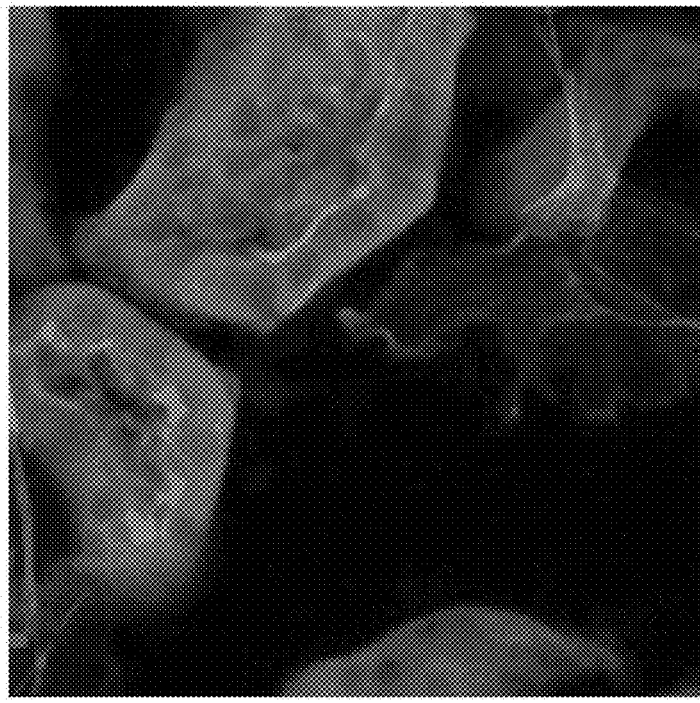
FIG. 2 shows a fluorescence image of a sample before one or more images of a sample is/are split into image data split according to dyes in accordance with one embodiment of the method according to the invention.
Figure 4A:
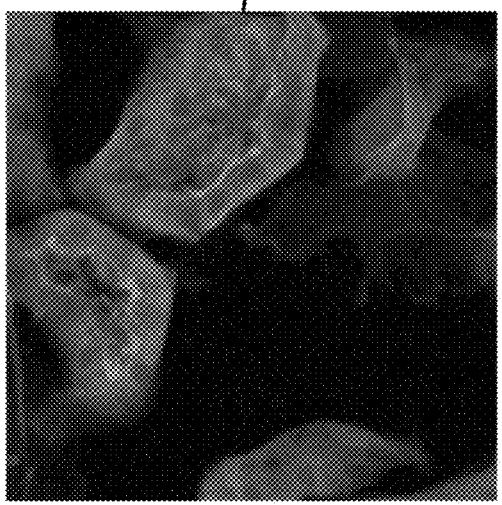
FIG. 4a shows show a channel or image split according to a green fluorescent dye by linear unmixing.
Figure 4B:
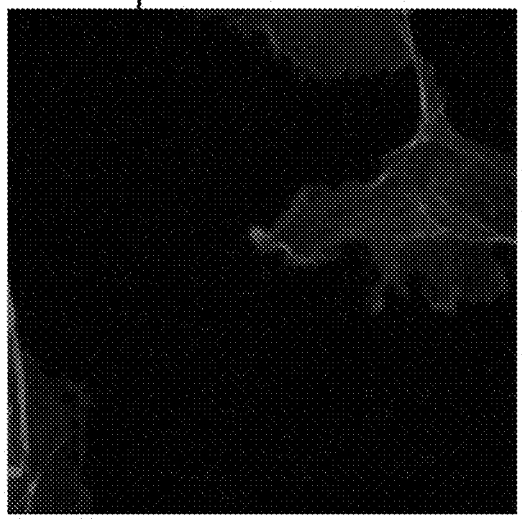
FIG. 4b shows show a channel or image split according to a red fluorescent dye by linear unmixing.

An embodiment with fluorescence images and fluorescent dyes is explained below. However, the indications and explanations are likewise applicable to images in general and dyes in general.

A sample is usually marked with more than one fluorescent dye, e.g. two or three fluorescent dyes. Afterward, one fluorescence image or image 20 or a plurality of fluorescence images of the marked sample is or are recorded by means of a microscope.

The sample can be a biological sample, e.g. living or dead cells or living or dead organisms, or a physical sample, i.e. an inanimate sample.

It is endeavored to split the fluorescence image or fluorescence images into images or image data 30-32 according to fluorescent dyes as accurately or correctly as possible, such that only fluorescence of one fluorescent dye is present in each image or each set of image data 30-32 (so-called unmixing) It is also possible, however, for one set of image data 30-32 or one image to contain only fluorescence of one fluorescent dye, and the other set of image data 30-32 or another image to contain the fluorescence e.g. of the two remaining fluorescent dyes.

However, in hitherto known methods for splitting one image 20 or images into image data 30-32 split according to dye, so-called elements or optical artefacts assigned to the incorrect dye can occur in the image data 30-32 split according to fluorescent dyes. An element or optical artefact assigned to the incorrect dye is or are pixels or a structure or partial structure of the sample which is or are assigned to a set of image data 30-32 or to an image which is not the set or image corresponding to the fluorescent dye. That is to say that after the image 20 or the images 20 has/have been split into image data 30-32 according to fluorescent dyes, pixels of (partial) structures of the sample that are marked only with a second fluorescent dye occur in the image for a first fluorescent dye. This is also referred to as so-called bleed-through between the different images/image data 30-32 or as so-called crosstalk between the images/image data 30-32.

The elements or optical artefacts assigned to the incorrect dye may arise or be brought about e.g. as a result of random influences (such as the noise of the input data or of the fluorescence images) and/or as a result of the inexact knowledge about the spectra of the fluorescent dyes used.

A machine learning system 10 or a system for machine learning is used for this splitting into image data 30-32 or sets of image data 30-32. The system is configured for splitting one or more images of a sample into image data 30-32 split according to dyes and comprises a machine learning system 10.

The machine learning system 10 can comprise a sparse dictionary learning system and/or an autoencoder.

The machine learning system 10 can comprise or be e.g. a neural network. In particular, the machine learning system 10 can comprise or be a deep learning system. Moreover, it is possible for the machine learning system 10 to comprise or be a convolutional fluorescent dye or a deep convolutional neural network.

Moreover, the machine learning system 10 can comprise or be a multilayer perceptron, in which besides the output layer there is also at least one further layer of hidden neurons (so-called hidden layer). All the neurons of one layer are completely linked to the neurons of the next layer with forward propagation (so-called feedforward network).

Furthermore, it is also conceivable for the machine learning system 10 to comprise or consist of one or more so-called generative adversarial networks.

The machine learning system 10 is trained to the effect of carrying out the splitting of images, in particular fluorescence images, into image data 30-32 split according to fluorescent dyes and removing elements or optical artefacts assigned to the incorrect dye or preventing or suppressing the presence of elements or optical artefacts assigned to the incorrect dye. The structure or structures of the sample respectively imaged is or are taken into account for this purpose. Human beings can recognize the elements or optical artefacts assigned to the incorrect dye usually on the basis of the context information, e.g. if the identical or very similar structures or partial structures occur with varying intensity or concentration (e.g. brightness) in more than one channel, e.g. in relation to the wavelength of channels adjacent to one another.

By means of corresponding training, the machine learning system 10 is trained to carry out on the basis of said structures the splitting of one or more fluorescence images 20 into image data 30-32 split or separated according to fluorescent dyes, in order to generate image data 30-32 or images with the fewest possible or no elements or artefacts assigned to the incorrect dye (i.e. incorrectly assigned pixels or structures). The machine learning system 10 recognizes at least one partial structure of the sample that is present in the image data 30-32 split according to dyes of more than one dye as an element or optical artefact assigned to the incorrect dye and removes the respective partial structure or the element or optical artefact assigned to the incorrect dye from the image data 30-32 of one or more dyes or prevents the occurrence or presence of the element or optical artefact assigned to the incorrect dye in the image data 30-32 output. Consequently, the occurrence or presence of elements or optical artefacts assigned to the incorrect dye in the image data 30-32 is prevented or reduced and the number of elements or optical artefacts assigned to the incorrect dye in the image data 30-32 generated thus decreases.

The input data input into the machine learning system 10 can comprise a stack or cluster of fluorescence images that includes as many channels as desired.

The fluorescence images can be raw data, i.e. unprocessed fluorescence images, or else be present as already stored/computed fluorescence images, i.e. as already processed fluorescence images. The fluorescence images input into the machine learning system 10 as input can be single-track, multi-track or lambda stack recordings. In the case of multi-track recordings, a plurality of recordings or images 20 of the same sample are created with different settings of the laser and/or of the detector. A lambda stack comprises a stack or set of images which each comprise a specific wavelength range. The wavelength ranges of a lambda stack are usually disjoint with respect to one another and directly adjoin one another.

In the case of unprocessed fluorescence images, the number of channels is dependent on the recording mode of the images 20. In the case of already processed or computed data, the number of channels is dependent on the processing or computation of the images 20 or recordings. By way of example, it is possible for the fluorescence images or the input data of the machine learning system 10 already to be the result of linear unmixing, such as is known from the prior art. The number of elements or optical artefacts which are assigned to the incorrect dye and which are still present in the image data 30-32 or images after the linear unmixing is reduced by means of the machine learning system 10 and respectively the method according to the invention. If the input data are channels already separated according to dyes by means of linear unmixing, then the number of channels of the input data and/or output data of the method can be equal to the number of fluorescent dyes used for marking the sample.

The number of fluorescence images used as input of the machine learning system 10 can vary depending on the type of fluorescence images. The fluorescence images can be unprocessed fluorescence images, wherein the fluorescence images are created by means of the use of a detector array (in this case, the number of fluorescence images is equal to the number of detector windows or equal to the number of channels of the detector). Alternatively, the fluorescence images can be lambda stack recordings (in this case, the number of fluorescence images is equal to the number of defined bands of the lambda stack). As a further alternative, the fluorescence images can be recordings with freely defined bandwidths in the multi- or single-track mode (in this case, the number of fluorescence images is typically equal to the number of dyes used). Moreover, it is conceivable for a single fluorescence image to be used as input of the machine learning system 10.

Besides the fluorescence images, the input data of the machine learning system 10 can contain the following further information that is taken into account by the machine learning system 10:

the spectra of the fluorescent dyes used that are present in the fluorescence image 20, and/or a spectra database of the fluorescent dyes used, which can serve for estimating and coordinating/matching the spectra present, and/or settings with regard to the recording of the fluorescence images, such as e.g. laser settings, detector settings, filter settings, smart setup settings and/or predictions concerning crosstalk or concerning elements or optical artefacts assigned to the incorrect dye.

The output data of the method and respectively of the machine learning system 10 usually contain image data 30-32 or images split according to fluorescent dyes. The image data 30-32 can themselves be images. It is also conceivable, however, for the method and respectively the machine learning system 10 to output only data or image data 30-32 by means of which images split according to fluorescent dyes can be calculated or created. For example, the data or image data can comprise or be a coefficient array that is used for subsequent linear unmixing for splitting the fluorescence image or fluorescence images according to dyes. This means that the machine learning system 10 calculates or determines the coefficients for the linear unmixing in such a way that the number of elements or optical artefacts assigned to the incorrect dye in the images split according to fluorescent dyes after linear unmixing using these coefficients is small.

Moreover, it is possible for the method and respectively the machine learning system 10 to output so-called difference images and/or to be trained thereon. If the difference images are subtracted in each case from the corresponding images or channels split according to fluorescent dyes by means of hitherto known methods, this results in images or image data 30-32 which contain fewer or even no longer any elements or optical artefacts assigned to the incorrect dye. This means that for each input channel or each fluorescence image that is input into the machine learning system 10, the machine learning system 10 generates a corresponding difference image, wherein as a result of the subtraction of the difference image from the corresponding fluorescence image, fluorescence images (output images) are generated which contain or have fewer to no elements or optical artefacts assigned to the incorrect dye.

The number of channels that are output by the method and respectively the machine learning system 10 can be any desired number. In this regard, it is conceivable for the images or image data 30-32 not only to be split according to fluorescent dyes, but additionally also to be split according to different regions or objects of the fluorescence images. Consequently, in the case of three fluorescent dyes and three objects, for example, there are nine channels or nine sets of image data 30-32 as output of the method and respectively the machine learning system 10. Moreover, it is possible for the fluorescence image to be split into two sets of image data 30-32 in regard to the three fluorescent dyes used (namely firstly one fluorescent dye in one set of image data or in one image and two fluorescent dyes in the other set of image data or in another image), with the result that in the case of three objects six output channels or images (=2*3) arise.

Preferably, the number of channels output by the method and respectively the machine learning system 10 corresponds to the number of fluorescent dyes used for marking the sample. Moreover, it is possible for the number of channels to correspond to the number of fluorescence images that are used as input.

In the image data 30-32 split according to dyes, in each case the absolute concentration of the respective fluorescent dye can be determined and displayed or output if a calibration was carried out, i.e. if there was a determination of which brightness value respectively corresponds to which concentration.

Furthermore, additional information can be output by the method and respectively the machine learning system 10 in addition to the image data 30-32 or channels. This may be for example information that may be useful for further processing of the channels or image data 30-32 or for representation purposes for the observer of the channels or image data 30-32 output. In particular, the additional information can comprise or be the selected spectra of the fluorescent dyes used (if a spectra database was part of the input), the estimated spectra of the fluorescent dyes used (if the spectra of the fluorescent dyes were not part of the input) and/or the refined or more precisely determined spectra of the fluorescent dyes (if the spectra and/or a spectra database were/was part of the input).

If a spectra database is present or was part of the input, the identifications or names of the fluorescent dyes used can additionally be output. A spectra database indicates the respective spectra or wavelengths of the different fluorescent dyes.

If the concentrations of the fluorescent dyes are estimated by the method and respectively the machine learning system 10, the confidence for each pixel or each partial structure can be output or indicated by the method and respectively the machine learning system 10. The confidence indicates the probability with which the respective pixel was correctly assigned to the respective fluorescent dye.

Moreover, it is possible for the machine learning system 10 and respectively the method to determine and output the type, size, number, etc. of the objects marked with the fluorescent dyes in the sample. By way of example, the number of marked cells can be determined and output by the method and respectively the machine learning system 10.

Splitting the fluorescence images 20 into sets of image data 30-32 or channels by means of the machine learning system 10 can take place on the basis of the unprocessed fluorescence images and/or on the basis of channels or images that have already been processed or have already been separated according to fluorescent dyes.

Firstly, an explanation is given below for improving fluorescence images that have already been processed by methods according to the prior art.

The fluorescence images 20 that serve as input for the method and respectively the machine learning system 10 can be fluorescence images (e.g., individual images and/or detector stack images) that have already been denoised by means of a denoising algorithm.

It is possible for the image data that are output by the machine learning system to be at least partly denoised by means of the machine learning system.

Moreover, it is possible that if the spectra of the fluorescent dyes are already present (from a database or on the basis of an estimation), the spectra of the fluorescent dyes are determined more accurately, that is to say that the spectra or the channels of the spectra are approximated to the actual values of the spectra or limits of the different fluorescent dyes and/or are adapted to the present sample. If the spectra of the fluorescent dyes used are not present, then it is possible to determine the spectra of the fluorescent dyes directly on the basis of the fluorescence images that influence the method and respectively the machine learning system 10 as input. For this purpose, the machine learning system 10 is trained in such a way that it learns a mapping of the input data or fluorescence images onto the spectra.

After linear or nonlinear unmixing has been carried out, elements or optical artefacts assigned to the incorrect dye (so-called bleed-through of one channel or of image data 30-32 of one fluorescent dye into image data 30-32 of another fluorescent dye) can be rectified or eliminated by means of the method and respectively the machine learning system 10 on the basis of the structures present in the fluorescence image(s). The advantage of this structure-based analysis or processing is, inter alia, that it is possible easily to ascertain bleed-through on the basis of identical structures at spatially the same location in channels—normally directly adjacent to one another—of the output or image data 30-32. What is crucial in this case is not the kind or type of structure per se, but rather the position and manifestation in the different channels or image data 30-32. This relationship can be learned by means of machine learning on the basis of a representative training sample, wherein there are various possibilities for mapping input data onto output data.

In the case of a first possibility, the input data or fluorescence images are analyzed or determined by means of a so-called patch-based method, wherein in this kind of analysis an image is analyzed on the basis of image segments of the image or is processed image segment by image segment. In this case, the input data or images resulting from the linear or nonlinear unmixing are split into patches by the machine learning system 10. In this case, the context available to the machine learning system 10, that is to say the visible structures, is limited by the size of the patch. Each input patch of the machine learning system 10 is mapped onto an output patch, wherein a bleed-through between the channels or image data 30-32 of the different dyes is suppressed or prevented by the machine learning system 10. Finally, the output patches are combined to form an overall image or a channel. This means that regions or patches of the overall fluorescence image are input to the machine learning system 10 successively and, after the splitting according to dyes, the regions or patches are combined again to form an overall fluorescence image.

A second possibility comprises a so-called image-to-image transformation; wherein the machine learning system 10 learns a mapping of the overall fluorescence image onto overall images or image data 30-32 of the overall image or is trained thereon. The procedure is for the most part identical to the patch-based method described above, but the use of the overall image means that a significantly larger context can be taken into account by the machine learning system 10. The machine learning system 10 outputs channels or images or image data 30-32 of the overall image that are split according to dyes.

Furthermore, it may be advantageous for the machine learning system 10 not to be trained on outputting the images or image data 30-32 themselves split correctly according to dyes, but rather to be trained on a correction or on a difference between the image data 30-32 already present and the image data 30-32 rectified vis-á-vis elements or optical artefacts assigned to the incorrect dye, and to output such image data 30-32. This means, for example, that for each channel of the output or each set of image data or images of linear unmixing in accordance with the prior art; by means of the machine learning system 10, a difference image is estimated or generated by which the respective channel of the output of the linear unmixing has to be corrected in order to obtain image data 30-32 in which elements or optical artefacts assigned to the incorrect dye have been removed or are no longer present or no longer occur. The difference image indicates in each case the difference between the output of the linear unmixing and the image data 30-32 or images rectified by the machine learning system 10 vis-à-vis elements or optical artefacts assigned to the incorrect dye. The advantage of this is that such difference images can be interpreted more intuitively by human beings during the training of the machine learning system 10 and elements or optical artefacts assigned to the incorrect dye can thus be recognized more easily. Moreover, the correction by the machine learning system 10 is more easily comprehensible to human beings, with the result that this machine learning system has a higher acceptance. Moreover, it has been found that training a machine learning system 10 on difference images or to generate difference images (so-called residual learning) is technically very simple and yields very good results, that is to say that by this means the number of elements or optical artefacts assigned to the incorrect dye is greatly reduced, possibly even reduced to a greater extent than in the case of training the machine learning system 10 to directly output image data 30-32 with few elements or optical artefacts assigned to the incorrect dye.

Improvement of unprocessed fluorescence images by means of the method or machine learning will now be described below.

In this case, the splitting into image data 30-32 ordered according to fluorescent dye is learned completely from the input data. In this case, the machine learning system 10 is trained in such a way that mapping is effected directly from the input stack or from the fluorescence images onto the output stack or the image data 30-32 or images. A prerequisite in this case is a sufficiently large database for training the machine learning system 10, wherein the database covers substantially all expected variations or possibilities. This is achieved by means of a simulation in which a multiplicity of recordings in which the sample was marked or stained in each case only with one dye are mixed or added to form an input stack or to form an individual fluorescence image and this is used in each case as input for the machine learning system 10. The recordings in which the sample was marked or stained in each case only with one dye are used as reference images that are intended to be output as image data 30-32 by the machine learning system 10. It is also possible to simulate different output data or channels such as, for example, single- and multi-track data or lambda stacks as input data of the machine learning system 10.

Moreover, the input data or the input stack can be rendered artificially noisy in order to approximate the input data to true fluorescence images or true recording conditions to an even greater degree. Precisely in the case of single-track recordings or lambda stacks there is often a lower signal-to-noise ratio, i.e. a high degree of noise. Those individual images which were mixed or added together to generate the input data or the input stack serve as ground-truth data, i.e. as output to be striven for of the machine learning system 10 being trained. A mapping from image stack to image stack is carried out in this case.

A further possibility besides improving fluorescence images already processed by methods according to prior art and improving unprocessed fluorescence images by means of the method or machine learning is for the unmixing, i.e. the splitting of the image(s) input into the machine learning system 10 according to dyes, to be implicitly learned, i.e, all required parameters that are estimated or predefined in traditional linear unmixing can be projected or determined with the aid of the machine learning system 10.

In this regard, for example, the coefficients (A) for solving the equation system of linear unmixing, the number of spectra, the spectra themselves or a combination thereof can be output by the machine learning system 10. A mapping of an input stack or of a plurality of fluorescence images onto an intermediate representation is generally carried out in this case, i.e. image data 30-32 or data for splitting the fluorescence images into channels are generated by the machine learning system 10. By means of the data and e.g. the linear unmixing, the fluorescence images input into the machine learning system 10 can be split into images or image data 30-32 split or separated according to dyes in such a way that said images or image data have few to no elements or optical artefacts assigned to the incorrect dye. Furthermore, it is also possible here to input additional information into the machine learning system 10, such as, for example, information about the spectra of the dyes used.

It is also possible for the machine learning system 10 to estimate or determine additional information (designation of the dyes used, number of dyes used) about the spectra and/or on the basis of the structures occurring in the fluorescence image that is input into the machine learning system 10. In this regard, by way of example, cell nucleus structures in a biological sample indicate the frequently used fluorescent dye DAR (4',6-diamidino-2-phenylindole), such that when cell nucleus structures are recognized, the machine learning system 10 can assume that this fluorescent dye was used.

Moreover, fluorescence images in the form of a Z-stack can be input into the machine learning system 10, i.e. fluorescence images that were recorded from the same sample in the manner offset with respect to one another along the optical axis of the microscope, and these images are split into image data 30-32 or images in a manner separated according to dyes by means of the method and respectively the machine learning system 10. In this case, the structure of the sample and/or similar or identical structures in the channels or images of the output can be recognized by the machine learning system 10 and, as a result, elements or optical artefacts assigned to the incorrect dye can be removed or the occurrence of elements or optical artefacts assigned to the incorrect dye can be prevented.

Furthermore, recordings that are temporally offset with respect to one another can be used as fluorescence images or input of the method and respectively the machine learning system 10. In this case, the structure of the sample and/or similar or identical structures in the channels of the output can be recognized by the machine learning system 10 and, as a result, artefacts can be removed or the occurrence of elements or optical artefacts assigned to the incorrect dye can be prevented or reduced.

The machine learning system 10 can in each case be adapted to the sample or kind of sample (e.g. biological sample or physical sample, etc.) or be specifically trained thereon. It is also conceivable, however, for the machine learning system 10 not to be actively changed, independently of the sample.

The channels or sets of image data 30-32 that are output by the machine learning system 10 can be equal to the number of fluorescence images of the input or input channels. The number of output channels of the machine learning system 10 can also correspond to the number of objects which the sample has.

The differentiation as to whether a specific element or a structure or a pixel in the fluorescence image is or is not an element or optical artefact assigned to the incorrect dye is based on structure information or recognized structures or partial structures of the sample in the fluorescence image, that is to say that the entire fluorescence image as context influences the splitting into image data 30-32 or images according to fluorescent dye.

The machine learning system 10 can be present or implemented on a commercially available computer. Moreover, it is conceivable for the machine learning system 10 to be implemented on a computer designed specifically for the machine learning system 10. In particular, the processors of one graphics card or on a plurality of graphics cards can be used for the required calculations of the machine learning system 10 and respectively of the method.

The method for training the machine learning system 10 can be carried out for example as follows. A fluorescence image is input to the machine learning system 10. The machine learning system 10 splits the fluorescence image into image data 30-32 or images ordered according to fluorescent dyes. Moreover, a human being identifies or has identified and removed in the respective channels the structures or regions representing elements or optical artefacts assigned to the incorrect dye (so-called bleed-through), i.e. the structures or regions that were assigned incorrectly to the respective image or channel. These image data 30-32 or images freed of elements or optical artefacts assigned to the incorrect dye are input to the machine learning system 10 as target output or desired output. The machine learning system 10 learns therefrom to avoid in future such elements or optical artefacts assigned to the incorrect dye. The machine learning system 10 undergoes supervised learning in this way.

A further possibility for training the machine learning system 10 is to use as training data images in which in each case the same sample or samples that are identical or similar to one another is or are marked in each case only with one fluorescent dye. These images are mixed or added together and the result is used as fluorescence image or fluorescence images as input of the machine learning system 10. Since the original images separated according to fluorescent dye are present, the machine learning system 10, without supervision and human assistance, can itself recognize which structures or regions or pixels of the result or of the output image data 30-32 of the machine learning system 10 represent an element or optical artefact assigned to the incorrect dye and which do not. As a result, the machine learning system 10 can be trained very rapidly.

The fluorescence images can also be images that were recorded by means of two-photon fluorescence microscopy. So-called second and third harmonic generation (i.e. frequency doubling and/or frequency tripling) is also taken into account in this case.

The machine learning system 10 can comprise a neural network, in particular a so-called deep neural network. The neural network comprises for example more than three layers, such that more than one so-called hidden layer is present.

The machine learning system 10 can comprise or be a convolutional neural network (CNN). In this case, the machine learning system 10 comprises a convolutional layer, which consists of a two-dimensional or three-dimensional matrix consisting of pixels. The activity of each neuron of this plane is calculated by means of a discrete convolution. The convolutional layer is followed by a so-called pooling layer, in which excess information is discarded. This can subsequently be followed again by a convolutional layer and thereafter a pooling layer, etc. Finally, the last pooling layer is followed by a fully-connected layer. The neurons of the fully-connected layer usually correspond to the number of channels into which the fluorescence image is intended to be split.

Linear unmixing is described for example in the article "Clearing up the signal: spectral imaging and linear unmixing in fluorescence microscopy", which was published in the journal "Methods in Molecular Biology" in 2014, 1075:129-48 (doi: 10.1007/978-1-60761-847-8_5).

In linear unmixing, it is assumed e.g. that a pixel is categorized as linearly mixed if the measured spectrum (S(λ)) corresponds to the weight (A) of each individual fluorescent dye reference spectrum (R(λ)):

$$S(\lambda) = A1 \cdot R1(\lambda) + A2 \cdot R2(\lambda) + A3 \cdot R3(\lambda) \ldots Ai \cdot Ri(\lambda)$$

This can be expressed more generally as:

$$S(\lambda) = \Sigma Ai \cdot Ri(\lambda) \text{ or } S = A \cdot R$$

In these equations, the signal in each pixel (S) is measured during the recording of the lambda stack and the reference spectrum of the known fluorescent dye is measured usually independently of one another in samples that are marked in each case only with one dye under identical instrument settings. Using algebra, the contributions of the different dyes (Ai) can be determined by calculating their contribution to each point in the measured spectrum.

By way of example, this can be determined by minimizing the square between the measured and the calculated spectra by applying the following differential equations:

$$[\partial \Sigma j \{S(\lambda j) - \Sigma Ai \cdot Ri(\lambda j)\}2]/\partial Ai = 0$$

In this equation, j represents the number of detection channels and i corresponds to the number of dyes.

It is also possible for the convolutional neural network (CNN) to comprise or be a non-reducing network.

LIST OF REFERENCE NUMERALS 10 machine learning system
20 image of the sample
30, 31, 32, 30', 31' image data split according to dyes

The invention claimed is:

1. A method for splitting one or more images of a sample into image data split into a plurality of different image data according to dyes, wherein the sample has at least two different dyes, the method comprising:
   providing the one or more images of the sample;
   inputting the one or more images into a machine learning system; and
   generating the image data split according to dyes from the one or more images with the machine learning system, wherein the machine learning system performs a structure-based analysis to remove at least one partial structure of the sample that is present in the image data split according to dyes of more than one dye from the image data of one or more dyes, and wherein the structure-based analysis comprises determining one or more identical and/or similar structures at a same position in the different image data and then removing the at least one partial structure of the sample based on the same position of the one or more identical and/or similar structures.

2. The method as claimed in claim 1, further comprising:
   inputting reference images into the machine learning system; and
   comparing the image data of the reference images split according to dyes with the machine learning system with image data of the reference images split correctly according to dyes for training the machine learning system for improved splitting of the one or more images of the sample into image data split according to dyes.

3. The method as claimed in claim 1, wherein the machine learning system comprises or is a neural network.

4. The method as claimed in claim 1, wherein
   the image is, or the images are, subjected to linear or nonlinear unmixing and/or denoising before being input into the machine learning system.

5. The method as claimed in claim 1, further comprising:
   besides the one or more images, inputting, into the machine learning system, spectra of the at least two different dyes, a spectra database for estimating and/or matching the spectra of the dyes present in the one or more images, recording settings and/or filter settings of the one or more images, detector settings of the one or more images and/or predictions concerning crosstalk between the different image data split according to dyes.

6. The method as claimed in claim 1, wherein the image data comprise output images, wherein each output image shows in each case a dye of the image or the images input.

7. The method as claimed in claim 1, wherein
   the machine learning system generates a coefficient array for linear unmixing,
   wherein the one or more images is/are split according to dyes by linear unmixing based on the coefficient array.

8. The method as claimed in claim 1, wherein the machine learning system generates one or more difference images from the image data split according to dyes, wherein images already separated according to dyes previously, minus the respective generated difference image associated therewith, generate output images separated according to dyes.

9. The method as claimed in claim 1, wherein
   the one or more images comprise or are recordings of the same sample that are temporally offset with respect to one another, and/or
   the one or more images comprise or are recordings of the same sample that are offset with respect to one another along an optical axis of a microscope by which the images were recorded.

10. The method as claimed in claim 1, wherein the machine learning system additionally determines or estimates a number of the at least two different dyes and/or identifies the at least two different dyes.

11. The method as claimed in claim 1, wherein the machine learning system further comprises:
    determines for each pixel of the image data output a confidence value indicating a probability that the pixel was assigned to correct image data corresponding to the dye, and/or
    determines an absolute concentration of the respective dye in the respective image data and/or
    determines a number of objects in the sample.

12. The method as claimed in claim 1, wherein
    the machine learning system is trained by first training recordings, wherein the first training recordings comprise recordings of samples marked in each case only with one dye, and/or
    the machine learning system is trained by second training recordings, wherein the second training recordings comprise combined recordings of image data already split correctly in each case according to dye.

13. The method as claimed in claim 2, wherein
    the image data of the reference images split correctly according to dyes comprise or are simulated image data generated with a physical model, and/or the reference images are generated with a physical model from the image data split correctly according to dyes.

14. The method as claimed in claim 1, wherein the machine learning system determines spectra of the at least two different dyes.

15. A non-transitory computer-readable medium storing instructions which are readable by a processor of a computer and which, when they the instructions are executed by the processor, cause the processor to carry out the method as claimed in claim 1.

16. A system for splitting one or more images of a sample into image data split into a plurality of different image data according to dyes, wherein the sample has at least two different dyes, wherein the system comprises:
- a machine leaning system configured to generate the image data split according to dyes from the one or more images of the sample input into the machine learning system, with the machine learning system,
- wherein the machine learning system performs a structure-based analysis to remove at least one partial structure of the sample that is present in the image data split according to dyes of more than one dye from the image data of one or more dyes, and wherein the structure-based analysis comprises determining one or more identical and/or similar structures at a same position in the different image data and then removing the at least one partial structure of the sample based on the same position of the one or more identical and/or similar structures.

17. The method as claimed in claim 1, wherein
- the at least two different dyes comprise at least one fluorescent dye, and
- the neural network is a deep learning system and/or a convolutional neural network.

18. An imaging method, comprising:
- marking a sample with at least a first dye and a second dye, wherein the second dye is different from the first dye,
- obtaining, with a microscope, at least one initial image of the sample,
- providing a signal based on the initial image to a machine learning system,
- generating, with the machine learning system, at least one first output image from the at least one initial image, wherein the first output image shows the first dye and is substantially devoid of optical artefacts of the second dye, and
- generating, with the machine learning system, at least one second output image from the at least one initial it wherein the second output image; the second dye and is substantially devoid of optical artefacts of the first dye,
- wherein generating the first output image comprises (a) removing an optical artefact of the second dye with the machine learning system based on image data of the first and second dyes, and/or wherein generating the second output image comprises (b) removing an optical artefact of the first dye with the machine learning system based on image data of the first and second dyes, the removing of (a) and (b) comprises performing a structure-based analysis comprising determining one or more identical and/or similar structures at a same position and then removing the optical artefact based on the same position of the one or more identical and/or similar structures.

* * * * *

UNITED STATES PATENT AND TRADEMARK OFFICE
CERTIFICATE OF CORRECTION

PATENT NO. : 11,430,232 B2
APPLICATION NO. : 15/733532
DATED : August 30, 2022
INVENTOR(S) : Manuel Amthor, Daniel Haase and Ingo Kleppe It is certified that error appears in the above-identified patent and that said Letters Patent is hereby corrected as shown below:

On the Title Page

In page 2, under Item (56) "OTHER PUBLICATIONS," Column 2, Line 12, currently reads:
"...arXiv:1501:00092v3 [cs.CV] Jul. 31, 2015, 14 pages.", And should read:
--arXiv:1501.00092v3 [cs.CV] Jul. 31, 2015, 14 pages.--;

In the Claims

Column 18, Lines 39 through 40, Claim 11, currently read:
"The method as claimed in claim 1, wherein the
machining learning system further comprises:", And should read:
--The method as claimed in claim 1, wherein the
machining learning system furthermore:--;

Column 19, Lines 1 through 2, Claim 15, currently read:
"...and which, when they the instructions are executed by the processor, ...", And should read:
--...and which, when the instructions are executed by the processor, ...--;

Column 20, Lines 12 through 14, Claim 18, currently reads:
"...generating, with the machine learning system, at least one
second output image from the at least one initial it
wherein the second output image; the second dye and is...", Signed and Sealed this
Twenty-first Day of February, 2023

*Katherine Kelly Vidal*

Katherine Kelly Vidal
*Director of the United States Patent and Trademark Office*

And should read:
--...generating, with the machine learning system, at least one
second output image from the at least one initial image,
wherein the second output image shows the second dye and is...--.